United States Patent
David et al.

(10) Patent No.: US 10,503,285 B1
(45) Date of Patent: Dec. 10, 2019

(54) RETRACTABLE TOUCHPAD BUTTON BUMPER

(71) Applicant: Dell Products, L.P., Round Rock, TX (US)

(72) Inventors: Michael David, Austin, TX (US); Ernesto Ramirez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/019,853

(22) Filed: Jun. 27, 2018

(51) Int. Cl.
G06F 3/0354 (2013.01)
G06F 1/16 (2006.01)
G06F 3/0488 (2013.01)

(52) U.S. Cl.
CPC ........ G06F 3/03547 (2013.01); G06F 1/1692 (2013.01); G06F 3/0488 (2013.01)

(58) Field of Classification Search
CPC ... G06F 3/03547; G06F 1/1692; G06F 3/0488
See application file for complete search history.

(56) References Cited

U.S. PATENT DOCUMENTS

| | | | | |
|---|---|---|---|---|
| 5,594,618 A * | 1/1997 | Sellers | ................ | G05G 9/047 200/6 A |
| 5,774,384 A * | 6/1998 | Okaya | ................ | G06F 1/1616 341/22 |
| 5,786,806 A * | 7/1998 | Fester | ................ | G05G 5/08 345/160 |
| 6,331,850 B1 * | 12/2001 | Olodort | ................ | G06F 1/1613 341/22 |
| 6,756,971 B1 * | 6/2004 | Ramey | ................ | G06F 1/1616 345/168 |
| 2004/0136154 A1 * | 7/2004 | Hsu | ................ | G06F 1/1616 361/679.55 |
| 2014/0311880 A1 * | 10/2014 | Krumpelman | ........ | H01H 13/14 200/5 A |

\* cited by examiner

*Primary Examiner* — Abhishek Sarma
(74) *Attorney, Agent, or Firm* — Baker Botts L.L.P.

(57) ABSTRACT

An information handling system may include a retractable touchpad button bumper assembly, including touchpad buttons configured to move between first and second touchpad button positions dependent on whether a lid portion of the information handling system is open or closed with respect to a base portion to which it is rotationally coupled. When the lid is opened, the touchpad buttons may be lowered into their first touchpad button positions, where the touchpad buttons lie in a recess in the base portion and operate as input devices for a touchpad. When the lid is closed, the touchpad buttons may be raised up to their second touchpad button positions, which are higher than their first positions relative to the base portion, and may serve as a bumpers between the base portion and the lid portion. The assembly may receive a signal indicating the lid state from a proximity sensor circuit.

20 Claims, 8 Drawing Sheets

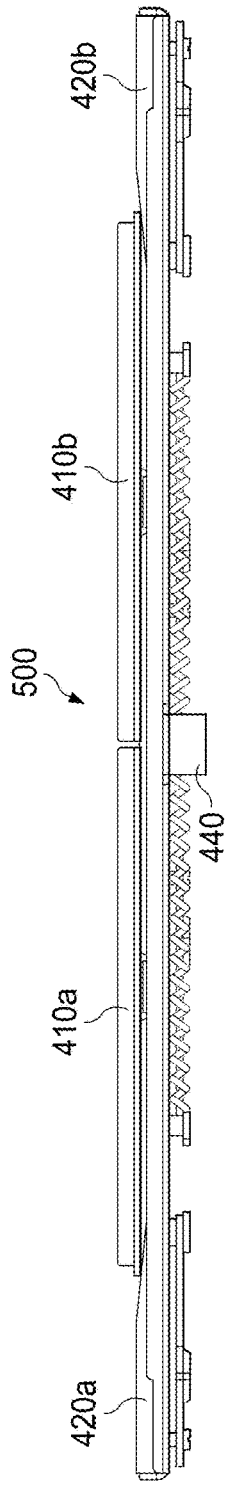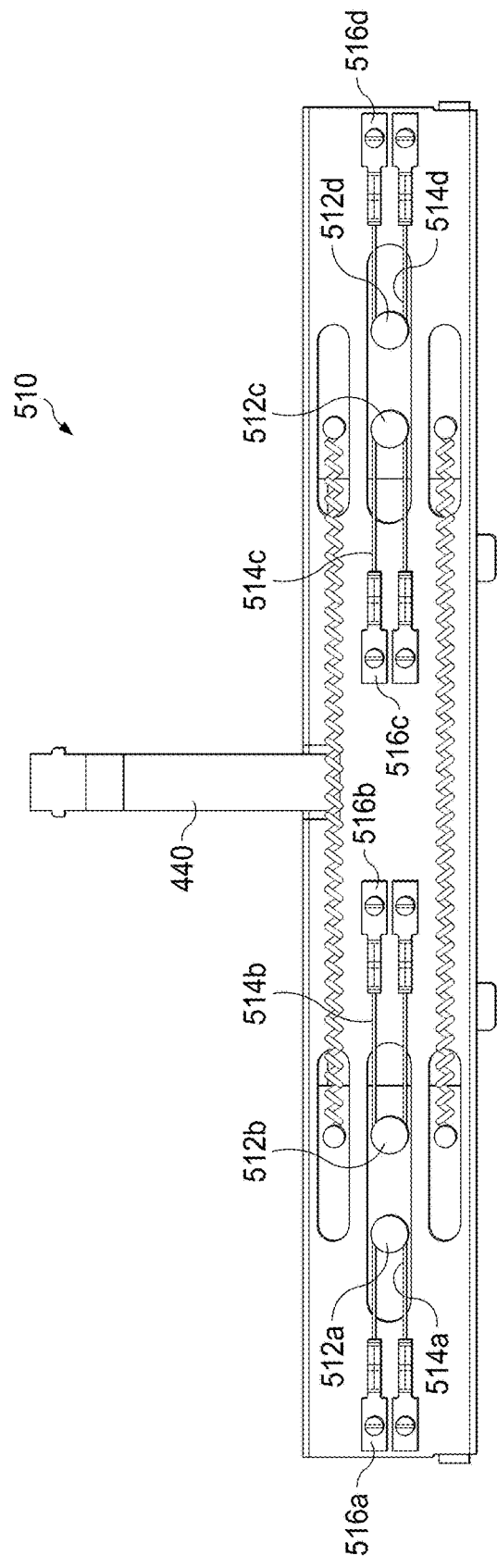

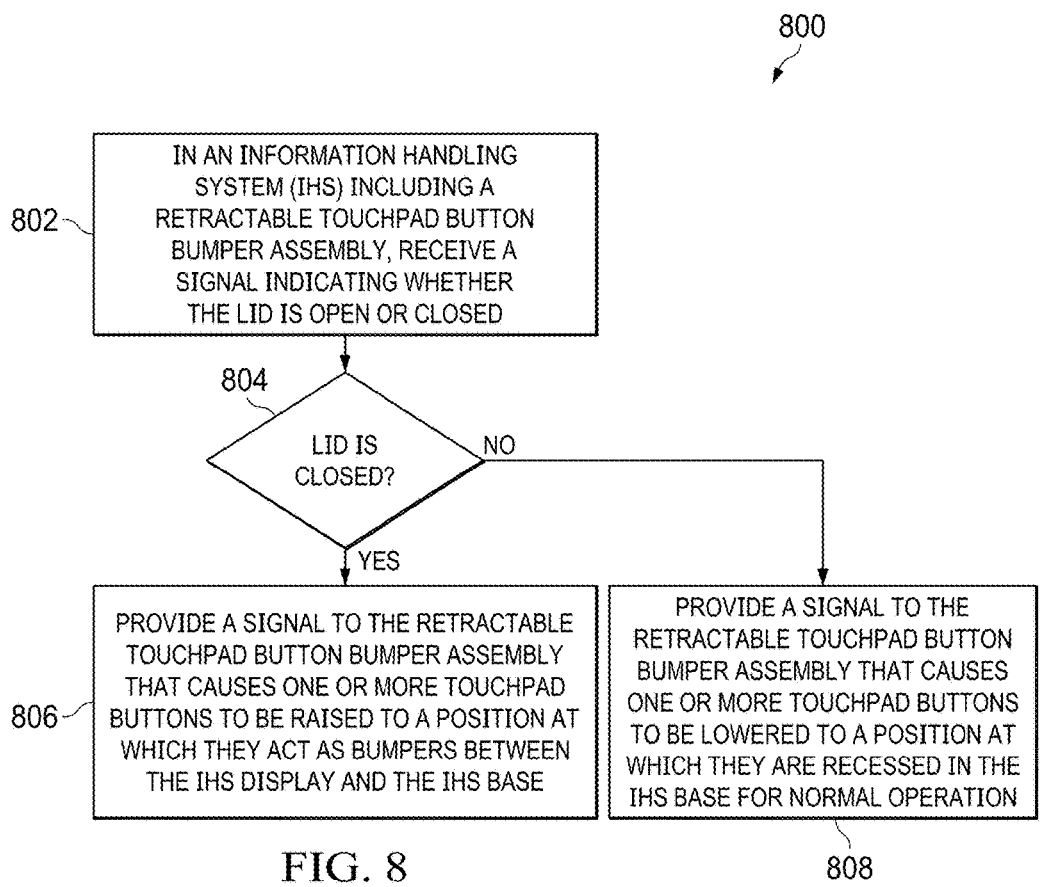

RETRACTABLE TOUCHPAD BUTTON BUMPER

BACKGROUND

Field of the Disclosure

This disclosure relates generally to information handling systems and, more particularly, to retractable touchpad button bumpers.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as laptop computers, notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device. Some portable information handling systems include detachable components, such as keyboards, or are themselves detachable from other components, such as docking stations.

With the introduction of narrow border panels for the display panel and/or base portions of a laptop computer, there is very little real estate available in which to integrate bumpers. Bumpers are typically needed to protect the display panel from buffing or scuffing when the computer is closed. For example, bumpers have traditionally been integrated into the bezel to prevent an LCD panel from rubbing on the keyboard and/or the LCD cover from rubbing on the palm rest when the computer is closed. In some existing systems, a soft touch paint is added to both the LCD and palm rest to provide a more durable finish that could potentially withstand buffing marks. In other existing systems, bumpers are added to the palm rest itself. In this case, however, the bumpers can interfere with the user, while typing, as they rest their palms in the area where the bumpers are located.

SUMMARY

In one aspect, a disclosed information handling system includes a base housing portion, a lid housing portion rotationally coupled to the base housing portion such that in a first lid position the lid housing portion is open with respect to the base housing portion and in a second lid position the lid housing portion is closed over the base housing portion, a touchpad installed in the base housing portion, and a retractable touchpad button bumper assembly coupled to the touchpad. The retractable touchpad button bumper assembly may include a retractable touchpad button configured to operate as an input device for the touchpad when the retractable touchpad button is in a first touchpad button position in a recess in the base housing portion and to serve as a bumper between the base housing portion and the lid housing portion when the retractable touchpad button is in a second touchpad button position, the second touchpad button position being higher than the first touchpad button position relative to the base housing portion. When the lid housing portion is open, the retractable touchpad button may be retracted into the first touchpad button position and when the lid housing portion is closed, the retractable touchpad button may be raised into the second touchpad button position.

In any of the disclosed embodiments, the retractable touchpad button bumper assembly may further include a communication interface through which the retractable touchpad button bumper assembly receives a lid state signal indicating whether the lid housing portion is open or closed. The retractable touchpad button may be retracted into the first touchpad button position responsive to the lid state signal indicating that the lid housing portion is open, and may be raised into the second touchpad button position responsive to the lid state signal indicating that the lid housing portion is closed.

In any of the disclosed embodiments, the retractable touchpad button bumper assembly may further include a wedge-shaped element. When the lid housing portion is open, only a first portion of the wedge-shaped element may lie between the retractable touchpad button and the base housing portion such that the wedge-shaped element does not prevent the retractable touchpad button from retracting into the first touchpad button position. When the lid housing portion is closed, the first portion of the wedge-shaped element and a second portion of the wedge-shaped element may lie between the retractable touchpad button and the base housing portion and the wedge-shaped element may apply an upward force on the retractable touchpad button such that the retractable touchpad button is raised into and held in the second touchpad button position.

In any of the disclosed embodiments, the retractable touchpad button bumper assembly may include two retractable touchpad buttons and two wedge-shaped elements, and at least a portion of each of the two wedge-shaped elements may lie between a respective one of the two retractable touchpad buttons and the base housing portion.

In any of the disclosed embodiments, the retractable touchpad button bumper assembly may further include a first muscle wire mechanically coupled to the wedge-shaped element and to the base housing portion such that when the first muscle wire is contracted it pulls the wedge-shaped element into a first wedge position in which only the first portion of the wedge-shaped element lies between the retractable touchpad button and the base housing portion, and a second muscle wire mechanically coupled to the wedge-shaped element and to the base housing portion such that when the second muscle wire is contracted it pulls the wedge-shaped element into a second wedge position in which the first portion of the wedge-shaped element and the second portion of the wedge-shaped element lie between the retractable touchpad button and the base housing portion.

In any of the disclosed embodiments, the retractable touchpad button bumper assembly may further include circuitry to drive a current to the first muscle wire when the lid housing portion is open, and to drive a current to the second muscle wire when the lid housing portion is closed.

In any of the disclosed embodiments, the retractable touchpad button bumper assembly may further include a motor-driven gear mechanically coupled to the wedge-shaped element. The motor-driven gear may be operable to move the wedge-shaped element into a first wedge position in which only the first portion of the wedge-shaped element lies between the retractable touchpad button and the base housing portion responsive to the lid housing portion opening. The motor-driven gear may be operable to move the wedge-shaped element into a second wedge position in which the first portion of the wedge-shaped element and the second portion of the wedge-shaped element lie between the retractable touchpad button and the base housing portion responsive to the lid housing portion closing.

In any of the disclosed embodiments, the retractable touchpad button bumper assembly may further include a wire form installed in the base housing portion and in contact with the retractable touchpad button. When the lid housing portion is opened, the wire form may be rotated about a rotation point in a first rotation direction such that the wire form applies a downward force on the retractable touchpad button lowering the retractable touchpad button into the first touchpad button position. When the lid housing portion is closed, the wire form may be rotated about the rotation point in a second rotation direction such that the wire form applies an upward force on the retractable touchpad button raising the retractable touchpad button into the second touchpad button position.

In another aspect, a disclosed retractable touchpad button bumper assembly includes a retractable touchpad button configured to move between a first touchpad button position and a second touchpad button position dependent on whether a lid housing portion of an information handling system in which the retractable touchpad button bumper assembly is installed is in an open position or a closed position with respect to a base housing portion of the information handling system to which the lid housing portion is rotationally coupled. When the lid housing portion is in the open position, the retractable touchpad button may be in the first touchpad button position, in which the retractable touchpad button is retracted into a recess in the base housing portion, and when the lid housing portion is in the closed position, the retractable touchpad button may be in the second touchpad button position, in which the retractable touchpad button is raised to a position higher than the first positon relative to the base housing portion.

In any of the disclosed embodiments, the retractable touchpad button bumper assembly may further include a communication interface through which the retractable touchpad button bumper assembly receives a lid state signal indicating whether the lid housing portion is in the open position or the closed position. The retractable touchpad button may be retracted into the first touchpad button position responsive to the lid state signal indicating that the lid housing portion is in the open position, and the retractable touchpad button may be raised into the second touchpad button position responsive to the lid state signal indicating that the lid housing portion is in the closed position.

In any of the disclosed embodiments, the retractable touchpad button bumper assembly may further include a wedge-shaped element. When the lid housing portion is in the open position, only a first portion of the wedge-shaped element may lie between the retractable touchpad button and the base housing portion such that the wedge-shaped element does not prevent the retractable touchpad button from retracting into the first touchpad button position. When the lid housing portion is in the closed position, the first portion of the wedge-shaped element and a second portion of the wedge-shaped element may lie between the retractable touchpad button and the base housing portion, and the wedge-shaped element may apply an upward force on the retractable touchpad button such that the retractable touchpad button is raised into and held in the second touchpad button position.

In any of the disclosed embodiments, the retractable touchpad button bumper assembly may include two retractable touchpad buttons and two wedge-shaped elements, and at least a portion of each of the two wedge-shaped elements may lie between a respective one of the two retractable touchpad buttons and the base housing portion.

In any of the disclosed embodiments, the retractable touchpad button bumper assembly may further include a first muscle wire mechanically coupled to the wedge-shaped element and to the base housing portion such that when the first muscle wire is contracted it pulls the wedge-shaped element into a first wedge position in which only the first portion of the wedge-shaped element lies between the retractable touchpad button and the base housing portion, and a second muscle wire mechanically coupled to the wedge-shaped element and to the base housing portion such that when the second muscle wire is contracted it pulls the wedge-shaped element into a second wedge position in which the first portion of the wedge-shaped element and the second portion of the wedge-shaped element lie between the retractable touchpad button and the base housing portion.

In any of the disclosed embodiments, the retractable touchpad button bumper assembly may further include circuitry to drive a current to the first muscle wire when the lid housing portion is in the open position, and drive a current to the second muscle wire when the lid housing portion is in the closed position.

In any of the disclosed embodiments, the retractable touchpad button bumper assembly may further include a gear mechanically coupled to the wedge-shaped element. The gear may be operable to move the wedge-shaped element into a first wedge position in which only the first portion of the wedge-shaped element lies between the retractable touchpad button and the base housing portion responsive to the lid housing portion opening, and the gear may be operable to move the wedge-shaped element into a second wedge position in which the first portion of the wedge-shaped element and the second portion of the wedge-shaped element lie between the retractable touchpad button and the base housing portion responsive to the lid housing portion closing.

In any of the disclosed embodiments, the retractable touchpad button bumper assembly may further include a wire form installed in the base housing portion and in contact with the retractable touchpad button. When the lid housing portion is opened, the wire form may be rotated about a rotation point in a first rotation direction such that the wire form applies a downward force on the retractable touchpad button lowering the retractable touchpad button into the first touchpad button position. When the lid housing portion is closed, the wire form may be rotated about the rotation point in a second rotation direction such that the wire form applies an upward force on the retractable touchpad button raising the retractable touchpad button into the second touchpad button position.

In any of the disclosed embodiments, the retractable touchpad button may be configured to operate as an input device for a touchpad to which the retractable touchpad button is coupled when in the first touchpad button position and to serve as a bumper between the base housing portion and the lid housing portion when in the second touchpad button position.

In yet another aspect, a disclosed method includes detecting, while a lid housing portion of an information handling system is in an open position with respect to a base housing portion of the information handling system to which the lid housing portion is rotationally coupled, that the lid housing portion is closing, and in response to detecting that the lid housing portion is closing, raising a retractable touchpad button from a first touchpad button position in which the retractable touchpad button lies in a recess in the base housing portion to a second touchpad button position at a height relative to the base housing portion at which the retractable touchpad button serves as a bumper between the base housing portion and the lid housing portion when the lid housing portion is closed over the base housing portion.

In any of the disclosed embodiments, the method may further include detecting, while the lid housing portion is closed over the base housing portion, that the lid housing portion is opening, and in response to detecting that the lid housing portion is opening, lowering the retractable touchpad button from the second touchpad button position to the first touchpad button position.

In any of the disclosed embodiments, detecting that the lid housing portion is closing may include receiving a signal from a proximity sensing circuit indicating that the lid housing portion has moved into proximity with the base housing portion, and detecting that the lid housing portion is opening may include receiving a signal from the proximity sensing circuit indicating that the lid housing portion has moved away from the base housing portion.

BRIEF DESCRIPTION OF THE DRAWINGS

For a more complete understanding of the present invention and its features and advantages, reference is now made to the following description, taken in conjunction with the accompanying drawings, in which:

FIGS. 5A-5D illustrate respective views of selected elements of an example mechanism for raising and lowering retractable touchpad buttons of an information handling system using a system of muscle wires, according to some embodiments;

FIG. 8 is a flow diagram illustrating selected elements of an embodiment of a method for providing retractable touchpad buttons in an information handling system, as described herein.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory, such as a solid-state drive (SSD) comprising solid-state flash memory; as well as communications media such wires, optical fibers, microwaves, radio waves, and other electromagnetic or optical carriers; or any combination of the foregoing.

Particular embodiments are best understood by reference to FIGS. 1-8 wherein like numbers are used to indicate like and corresponding parts.

Figure 1:
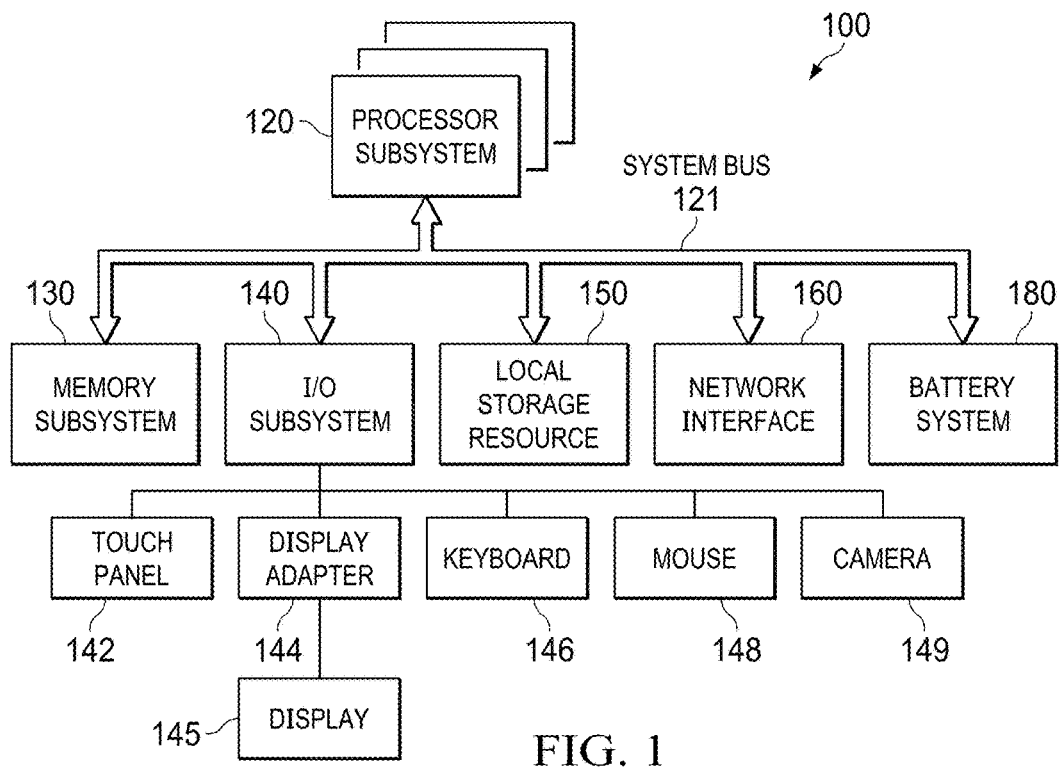
FIG. 1 is a block diagram of selected elements of an embodiment of an information handling system.

Turning now to the drawings, FIG. 1 illustrates a block diagram depicting selected elements of an embodiment of an information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, a network interface 160, and battery system 180. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. Battery system 180 may represent a rechargeable battery and related components included with information handling system 100.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or other digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource). In some embodiments, processor subsystem 120 may implement, or be coupled to, an embedded controller (not shown). The embedded controller may include circuitry and/or logic for receiving a lid state signal as an input and providing one or more control signal outputs to a retractable touchpad button bumper assembly (not shown) to cause one or more retractable touchpad buttons thereof to be raised and/or lowered. In some embodiments, the embedded controller may be or include a microcontroller. For example, the microcontroller may be an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In some embodiments, the microcontroller may be or include a field programmable gate array (FPGA).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. Local storage resource 150 may comprise computer-readable media (e.g., hard disk drive, floppy disk drive, CD-ROM, and other type of rotating storage media, flash memory, EEPROM, or another type of solid-state storage media) and may be generally operable to store instructions and data.

In information handling system 100, I/O subsystem 140 may comprise a system, device, or apparatus generally operable to receive and transmit data to, from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142, display adapter 144, keyboard 146, mouse 148, and camera 149. In other embodiments, I/O subsystem 140 may include more, fewer, or different input/output devices or components. Touch panel 142 may include circuitry for enabling touch functionality in conjunction with a display device, shown as display 145, that is driven by display adapter 144. Camera 149 may represent any of a variety of imaging devices, such as a video camera, infrared camera, or combinations thereof. In some embodiments, a touchpad including one or more retractable mechanical touchpad buttons (not shown in FIG. 1) may be integrated with or coupled to keyboard 146 and may operate, at least at certain times, as input devices for keyboard 146. In some embodiments, one or more retractable mechanical touchpad buttons (not shown in FIG. 1) may be integrated with or coupled to touch panel 142 and may operate, at least at certain times, as input devices for touch panel 142. Each such retractable mechanical touchpad button may include, for example, a mechanical switch or a capacitive sensing device that may implement a switch, and/or may provide a signal when a user touches or depresses the retractable mechanical touchpad button to indicate user input. Examples of retractable touchpad buttons are illustrated in FIGS. 2, 3, 4A-4B, 5A, 5C, 6, and 7A-7C and described below.

In various embodiments of information handling system 100, such as portable devices or so-called all-in-one devices, display 145 may be mechanically integrated with other components. Furthermore, touch panel 142 may be integrated into display 145 such that a touch user interface is provided to a user. The touch user interface typically coincides with a pixel space of display 145 such that touch inputs correspond to certain display pixels, which may present user interface elements, such as buttons, menus, input fields, etc., to the user.

In some embodiments, one or more of the devices or components shown within I/O subsystem 140 may be detachable from information handling system 100. For example, in embodiments in which information handling system 100 is a portable information handling system, such as a laptop computer or a tablet computing device, keyboard 146 may be detachable from the information handling system. In some embodiments in which information handling system 100 is a portable information handling system, the information handling system may be detachable from a docking station or base.

In some embodiments, an information handling system may include a base housing portion rotationally coupled to a lid housing portion via a hinge assembly such that a user may rotate the base housing portion and/or the lid housing portion relative to each other. The base housing portion and lid housing portion may, collectively, house one or more components of the portable information handling system, including but not limited to processor subsystem 120, system bus 121, memory subsystem 130, I/O subsystem 140, local storage resource 150, network interface 160, battery system 180, touch panel 142, display adapter 144, display 145, keyboard 146, and/or camera 149 described above with respect to FIG. 1. In some embodiments, a keyboard (such as keyboard 146) may be housed in the base housing portion (sometimes referred to herein as simply "the base") and a display (such as display 145 may be housed in the lid housing portion (sometimes referred to herein as simply "the lid"). When the information handling system is not in use, the lid housing portion may be closed over the top of base housing portion so that the display is protected from unintended use or damage.

Figure 2:
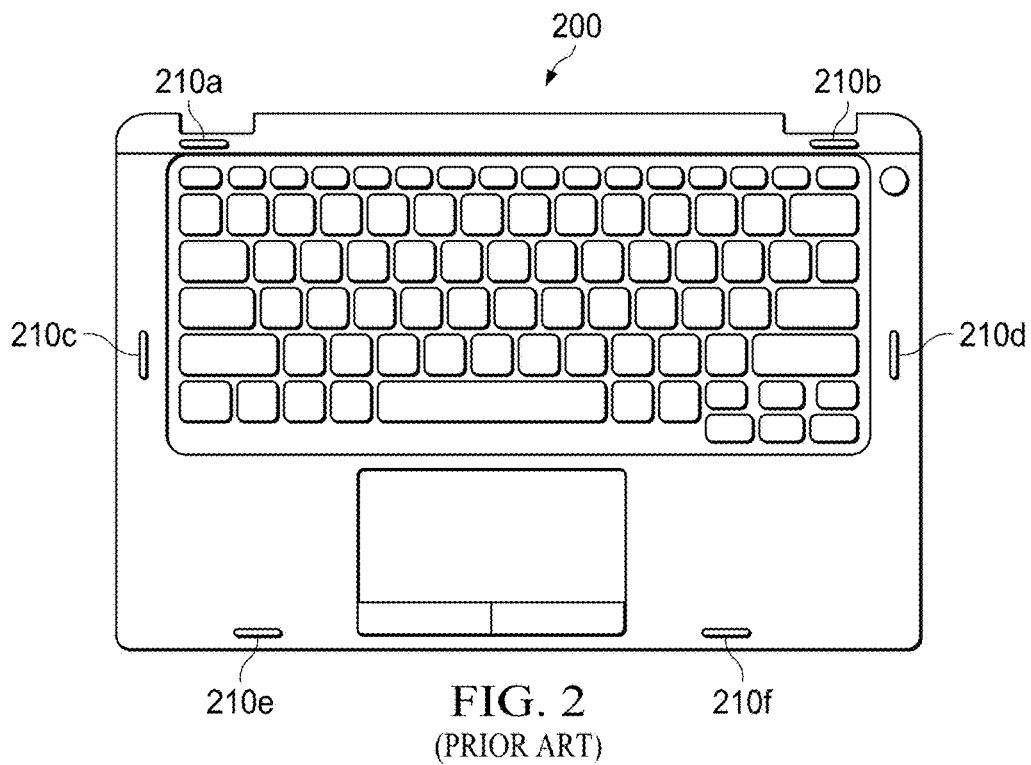
FIG. 2 illustrates selected elements of a typical information handling system including six bumpers.

As described above, some existing information handling systems may include bumpers that have been integrated into the base housing portion to prevent a display panel (e.g., an LCD panel) from rubbing on the keyboard and/or to prevent a display cover (e.g., an LCD cover) from rubbing on the palm rest when the information handling system lid is closed. FIG. 2 illustrates selected elements of a typical information handling system 200 including six such bumpers, shown as bumpers 210a-210f. In this example, the six bumpers are distributed around the periphery of the base housing portion of information handling system 200. When bumpers 210e and 210f are disposed as shown in FIG. 2, they may interfere with a user's palms when the user is typing during normal operation. This issue may be exacerbated when the information handling system bezel includes narrow borders.

In at least some embodiments of the present disclosure, the user experience, when working with information handling systems with narrow borders, may be enhanced by configuring one or more touchpad buttons to serve as bumpers when the lid housing portion of the information handling system is closed but not to interfere with the user during normal operation. More specifically, when the lid housing portion is closed, one or more touchpad buttons may be raised from their respective standard operating positions in a recess in the base housing portion to respective higher positions (e.g., above a palm rest of the base housing portion), where they may be locked in place and act as bumpers between the lid housing portion and the base housing portion. When the lid housing portion is opened, the touchpad buttons may be released and may retract into the recess in the base housing portion for normal operation.

In some embodiments, the base housing portion and/or the lid housing portion of the information handling system may include a proximity sensing circuit including one or more magnets and one or more proximity sensors. The magnets may allow the information handling system to be in a fixed position when a magnet of the base housing portion is in proximity of a magnet of the lid housing portion such that the two magnets magnetically couple with each other. In some embodiments, the proximity sensors may include Hall effect switches. In some embodiments, the proximity sensors may sense when the base house portion and the lid housing portion are magnetically coupled to each other, or are in close proximity to each other, and may provide a signal indicating this condition. For example, in some embodiments, a proximity sensing circuit may provide a lid state signal to a retractable touchpad button assembly indicating whether the lid is open or closed. This signal may also be provided to other components of the information handling system, such as to activate a sleep mode or another power saving mode when the lid is closed or to cause the information handling system to wake from a sleep mode when the lid is opened. In some embodiments, a proximity sensing circuit may provide a lid state signal to a retractable touchpad button assembly indicating that the lid is in the process of closing or that it has moved into proximity with the base. In yet another example, a proximity sensing circuit may provide a lid state signal to a retractable touchpad button assembly indicating that the lid is in the process of opening or that it has moved away from the base housing portion. In other embodiments, a lid state signal may be generated and provided to a retractable touchpad button assembly, either directly or indirectly, using other techniques. For example, in some embodiments, a lid state signal may be generated (e.g., by a proximity sensing circuit) and provided as an input to a processor subsystem or embedded controller in the information handling system which may, in turn, provide one or more control signal outputs to a retractable touchpad button bumper assembly to cause one or more retractable touchpad buttons thereof to be raised and/or lowered.

FIGS. 3A-3D illustrate respective views of selected elements of an information handling system including a retractable touchpad button bumper assembly, according to some embodiments. In some embodiments, the information handling system may include elements similar to those of information handling system 100 illustrated in FIG. 1. In the illustrated example, the information handling system includes a touchpad and two retractable touchpad buttons housed in the base housing portion of the information handling system.

Figure 3A:
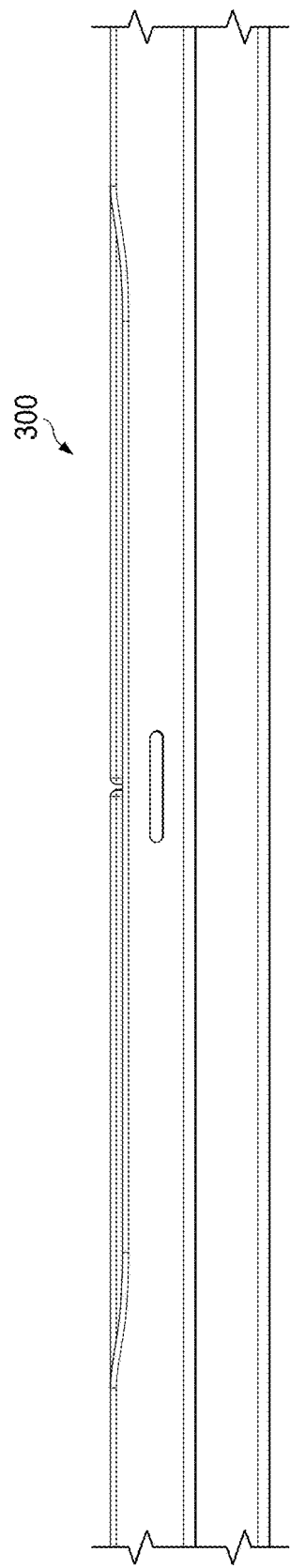
FIGS. 3A-3D illustrate respective views of selected elements of an information handling system including a retractable touchpad button bumper assembly, according to some embodiments.
Figure 3B:
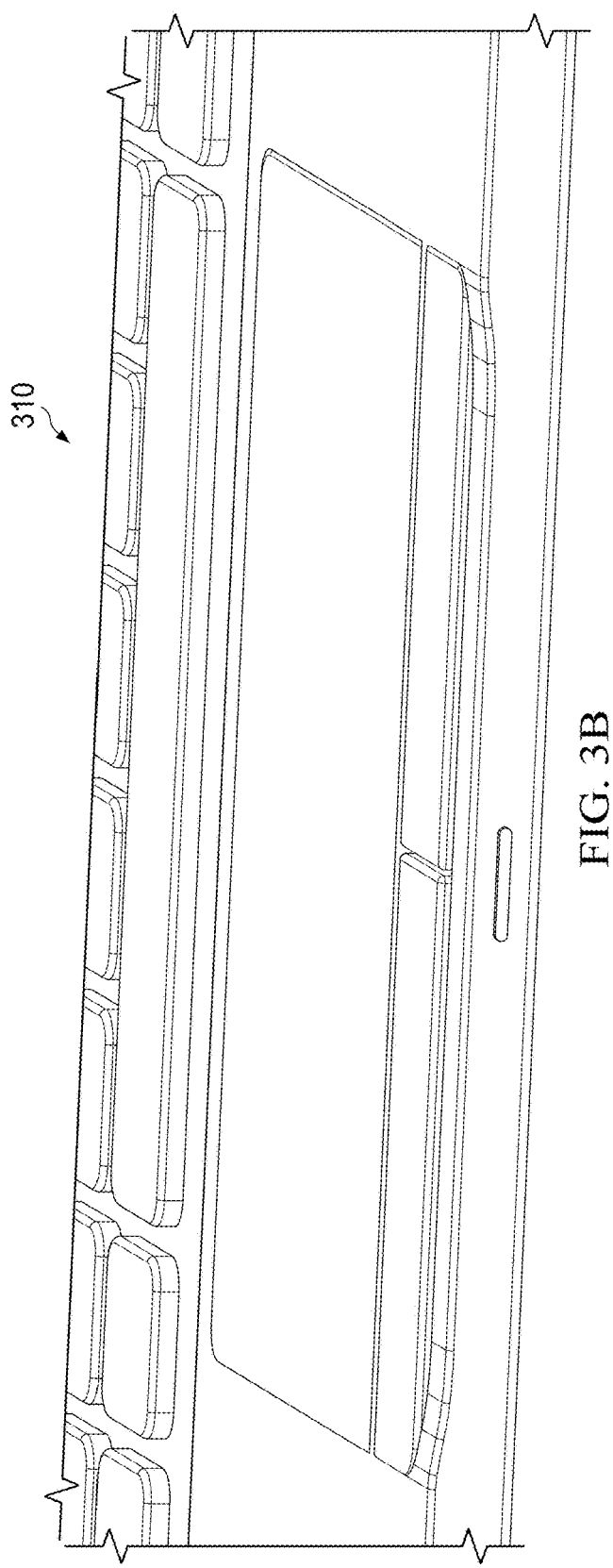

Specifically, FIG. 3A illustrates a front view 300 of selected elements of the retractable touchpad button bumper assembly, as installed in the information handling system. FIG. 3B illustrates an isometric view 310 of selected elements of the retractable touchpad button bumper assembly. In FIGS. 3A and 3B, the touchpad buttons are shown in their standard operating positions, in which they are retracted into a recess in the base housing portion of the information handling system. When the touchpad bumpers are in the illustrated standard operating position, they may function as mechanical user interface elements.

Figure 3C:
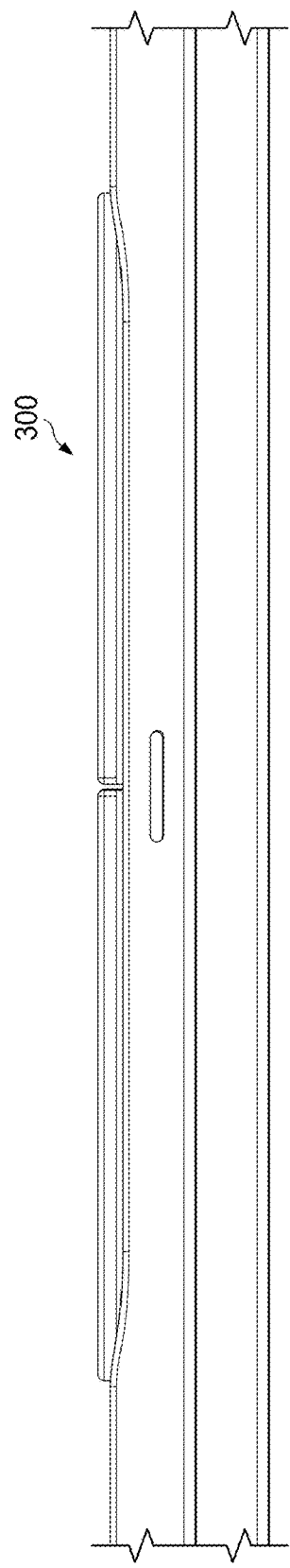
Figure 3D:
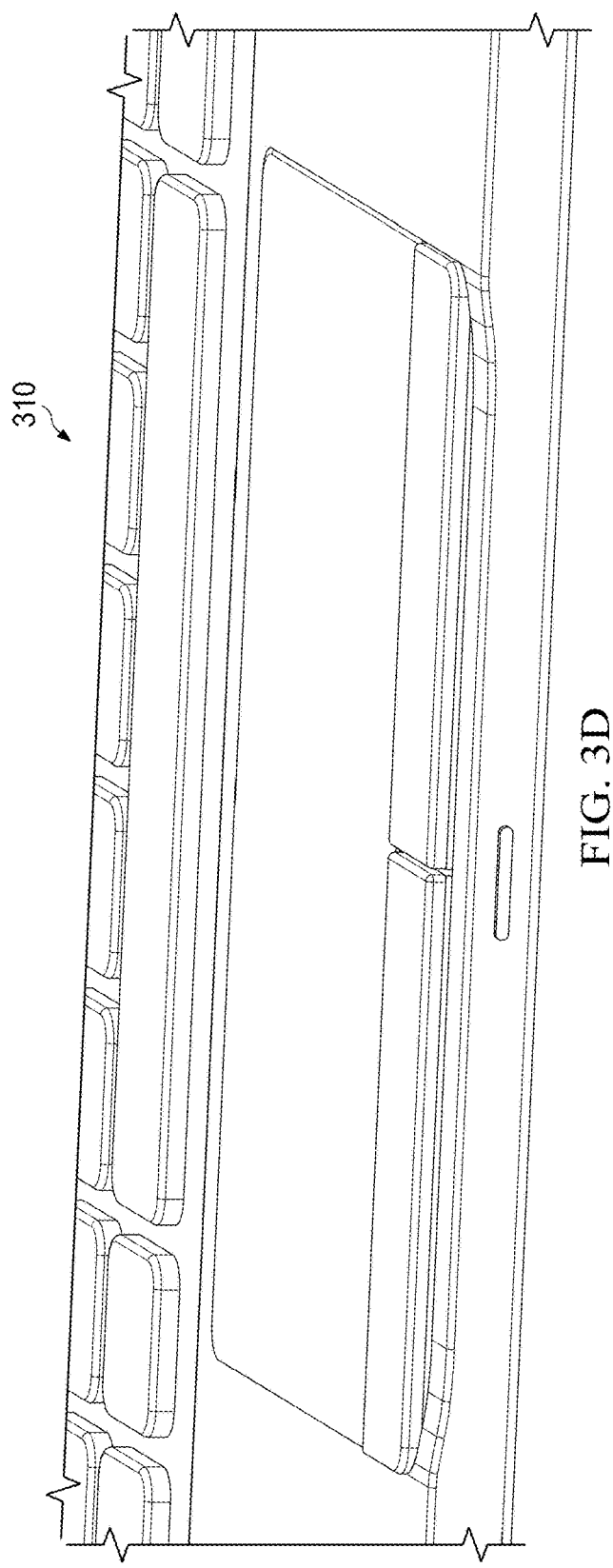

FIG. 3C illustrates a front view 300 of selected elements of the retractable touchpad button bumper assembly, as installed in the information handling system. FIG. 3D illustrates an isometric view 310 of selected elements of the retractable touchpad button bumper assembly, as installed in the information handling system. In FIGS. 3C and 3D, the touchpad buttons are shown in their raised and locked positions. When the touchpad buttons are in the illustrated raised and locked position, they may function as bumpers to prevent a display panel (e.g., an LCD panel) from rubbing on the keyboard when the information handling system lid is closed.

Various components of the retractable touchpad button bumper assembly are further illustrated in one or more of FIGS. 4A-4B, 5A-5D, 6, and 7A-7C, in accordance with particular embodiments, and described in more detail in reference to those figures.

Figure 4A:
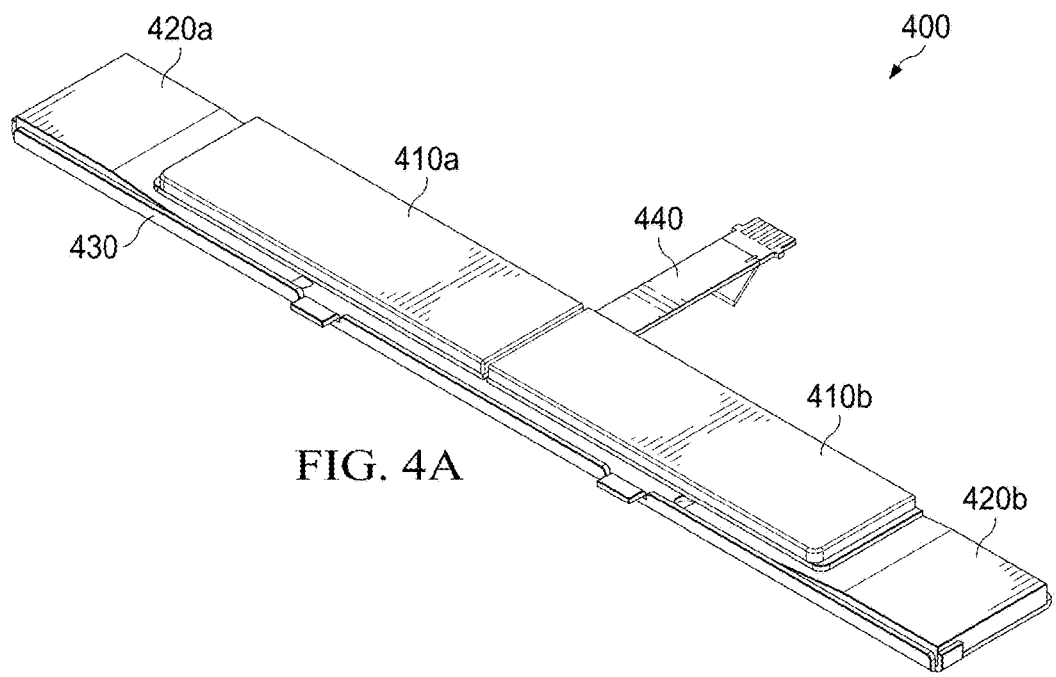
FIGS. 4A and 4B illustrate isometric views of selected elements of an example retractable touchpad button bumper assembly, according to at least some embodiments.
Figure 4B:
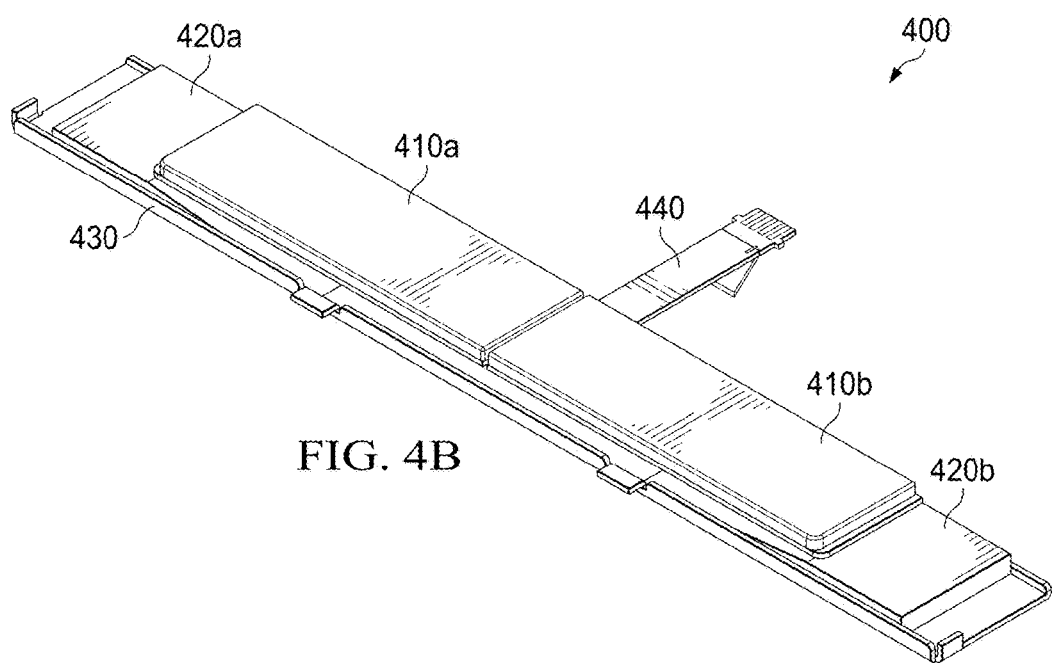

FIGS. 4A and 4B illustrate isometric views of selected elements of an example retractable touchpad button bumper assembly 400, according to at least some embodiments. In some embodiments, example retractable touchpad button bumper assembly 400 may be configured for installation in an information handling system similar to the information handling system illustrated in FIGS. 3A and 3B, which may include additional components such as those of information handling system 100 illustrated in FIG. 1. In the illustrated example, retractable touchpad button bumper assembly 400 includes two retractable touchpad buttons, shown as 410a and 410b, and two moveable wedge elements, shown as wedges 420a and 420b. The retractable touchpad button bumper assembly 400 also includes a bracket 430, which holds retractable touchpad buttons 410a and 410b and wedges 420a and 420b, among other elements, and a wiring harness 440. In some embodiments, bracket 430 may be integrated with the base housing portion of an information handling system into which the retractable touchpad button bumper assembly 400 is installed. In other embodiments, bracket 430 may be mechanically coupled to the base housing portion of an information handling system when the retractable touchpad button bumper assembly 400 is installed in the information handling system.

As described in detail herein, each of the wedges 420 is positioned below a respective one of the retractable touchpad buttons 410 and above bracket 430 such that at least a portion of the wedge 420 lies underneath the respective retractable touchpad button 410 at any given point in time. Each wedge 420 may be movable to allow a greater or lesser portion of the wedge 420 to be positioned underneath a respective one of the retractable touchpad buttons at different times.

For example, FIG. 4A illustrates that when wedge 420a is in its first position (referred to herein as the standard operating position), a lesser portion of wedge 420a may lie underneath retractable touchpad button 410a than when it is in its second positon. In this first position, wedge 410a allows retractable touchpad button 410a to lie within a recess in bracket 430 where it does not interfere with a user while typing or using the touchpad as an input mechanism during normal operation (e.g., when the when the information handling system lid is open). In this first position, retractable touchpad button 410b functions as a touchpad button. In this first position, wedge 420a is located relatively close to the outside edge of bracket 430 near the far left side of bracket 430, as shown. Similarly, wedge 420b is shown in its first position relatively close to the outside edge of bracket 430 near the far right side of bracket 430, allowing retractable touchpad button 410b to lie within a recess in bracket 430 where it functions as a touchpad button and does not interfere with a user while typing or using the touchpad as an input mechanism during normal operation.

FIG. 4B illustrates that when wedge 420a is in its second position, a greater portion of wedge 420a may lie underneath retractable touchpad button 410a than when wedge 420a is in its first position (i.e., its standard operating position). Specifically, when wedge 420a is in its second position, both the first portion of wedge 420a that lies underneath the touchpad button 410a when wedge 420a is in its first position and a second thicker portion of wedge 420a lie underneath the touchpad button 410a. In this second position, due to its wedge shape, wedge 420a applies an upward force on retractable touchpad button 410a causing retractable touchpad button 410a to move upward into its raised and locked position. More specifically, moving wedge 410a into its second position causes retractable touchpad button 410a to be raised to a height at which it can function as a bumper (e.g., when the information handling system lid is closed). In this second position, wedge 420a is located nearer to the center of bracket 430, as shown. Similarly, wedge 420a is shown in its second position nearer to the center of bracket 430, causing retractable touchpad button 410b to be raised to a height at which it can function as a bumper (e.g., when the information handling system lid is closed).

In the example embodiment illustrated in FIGS. 4A and 4B, wiring harness 440 may carry signals from the retractable touchpad button bumper assembly 400 to other components of an information handling system in which it is installed. In addition, wiring harness 440 may carry signals from the information handling system components to the retractable touchpad button bumper assembly 400. For example, wiring harness 440 may carry signals representing the inputs to and outputs from each of the retractable touchpad buttons 410, including control signals provided to the buttons (e.g., to configure them for different functions, if supported in the system) and output signals representing the state of each of the buttons (e.g., information indicating whether the button is currently depressed or making contact with sensing circuitry below the button and/or information indicating a specific location on the button at which the button is depressed or makes contact with sensing circuitry below the button). In addition, wiring harness 440 may carry a signal from a component of an information handling system in which it is installed to the retractable touchpad button bumper assembly 400 indicating whether the information handling system lid is open or closed. This signal may be used directly or indirectly to cause the wedges 420 to move into either their respective first positions or their respective second positions described above and illustrated in the figures.

In at least some embodiments, wiring harness 440 may couple retractable touchpad button bumper assembly 400 to the system bus of an information handling system in which it is installed (such as system bus 121 illustrated in FIG. 1) through an input/output interface or subsystem of the information handling system (such as I/O subsystem 140 illustrated in FIG. 1). In some embodiments wiring harness 440 may be implemented using a flexible wiring harness. In other embodiments, wiring harness 440 may be implemented using another type of physical wire cabling. In still other embodiments, a different type of communication interface (e.g., other than physical wires) may be used to carry signals between the retractable touchpad button bumper assembly 400 and an information handling system in which it is installed.

In some embodiments, a system of muscle wires may be used to cause wedges between the retractable touchpad buttons and the retractable touchpad button bumper assembly bracket to be raised and locked into a position in which they act as bumpers (e.g., when the information handling system lid is closed) and to be released, allowing them to be lowered into a position at which they function as touchpad buttons (e.g., during normal operation of the information handling system), at different times.

Figure 5C:
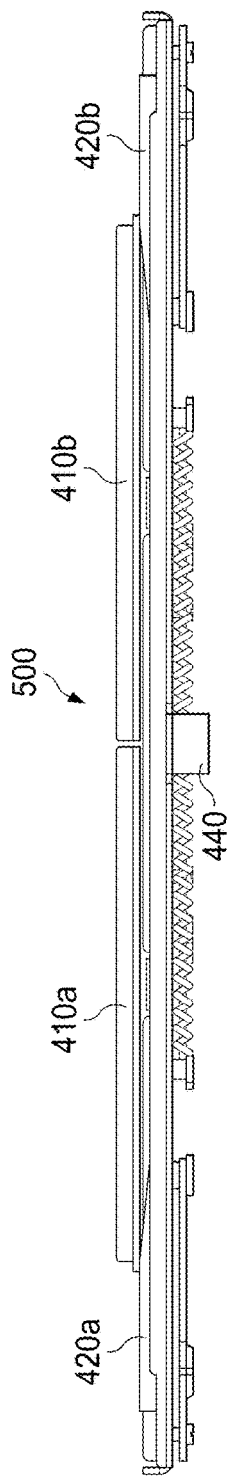

FIGS. 5A-5D illustrate respective views of selected elements of an example mechanism for raising and lowering retractable touchpad buttons of an information handling system using a system of muscle wires, according to some embodiments. In some embodiments, the information handling system illustrated in FIGS. 5A-5D may be similar to the information handling system illustrated in FIGS. 3A and 3B or an information handling system into which retractable touchpad button bumper assembly 400 illustrated in FIGS. 4A and 4B is installed. Specifically, FIG. 5A depicts a back view 500 of an information handling system in which touchpad buttons 410*a* and 410*b*, wedges 420*a* and 420*b*, and wiring harness 440 of a retractable touchpad button bumper assembly 400 are visible. In FIG. 5A, wedges 420*a* and 420*b* are shown in their respective first positions located near the outside edges of the information handling system, allowing touchpad buttons 410*a* and 410*b* to be in position to function as touchpad buttons.

FIG. 5B depicts a bottom view 510 of selected elements of the information handling system shown in FIG. 5A. In FIG. 5B, four sets of clamps 516, four muscle wires 514, four posts 514, and a wiring harness 440, among other elements, are visible. In some embodiments, a current may be driven to a particular pair of the muscle wires causing them to contract. This may, in turn, pull the wedges in a particular direction, causing the retractable touchpad buttons to be raised or lowered. In the illustrated example, two of the posts 512 are integrated with, or mechanically coupled to, one of the wedges 420, and two of the posts 512 are integrated with, or mechanically coupled to, the other one of the wedges 420. Each of the muscle wires 514 is held in place at its ends by one of the pairs of clamps 516 and is wrapped around one of the posts 512. In some embodiments, posts 512 may be screws or standoffs. In other embodiments, each post 512 may be a feature one of the wedges 420 that protrudes toward the bottom of the information handling system.

In the illustrated example, posts 512*a* and 512*b* are integrated with, or mechanically coupled to, wedge 420*a* (not shown in FIG. 5B) such that wedge 420*a*, post 512*a*, and post 512*b* all move together toward clamps 516*a* on the left outer edge of the information handling system when muscle wire 514*a* contracts (e.g., when a controlling current is applied to muscle wire 514*a*). In this case, wedge 420*a* moves into a position in which retractable touchpad button 410*a* (not shown in FIG. 5B) is able to retract into its standard operating position and is held in that position until and unless the controlling current is removed from muscle wire 514*a*. Similarly, posts 512*c* and 512*d* are integrated with, or mechanically coupled to, wedge 420*b* (not shown in FIG. 5B) such that wedge 420*b*, post 512*c*, and post 512*d* all move together toward clamps 516*d* on the right outer edge of the information handling system when muscle wire 514*d* contracts (e.g., when a controlling current is applied to muscle wire 514*d*). In this case, wedge 420*b* moves into a position in which retractable touchpad button 410*b* (not shown in FIG. 5B) is able to retract into its standard operating position and is held in that position until and unless the controlling current is removed from muscle wire 514*d*.

FIG. 5C depicts a back view 510 of selected elements of the information handling system shown in FIGS. 5A and 5B in which the touchpad buttons 410*a* and 410*b*, wedges 420*a* and 420*b*, and wiring harness 440 of a retractable touchpad button bumper assembly 400 are visible. In FIG. 5C, wedges 420*a* and 420*b* are shown in their respective second positions located closer to the center of the information handling system, causing touchpad buttons 410*a* and 410*b* to be raised and locked in position to function as bumpers.

Figure 5D:
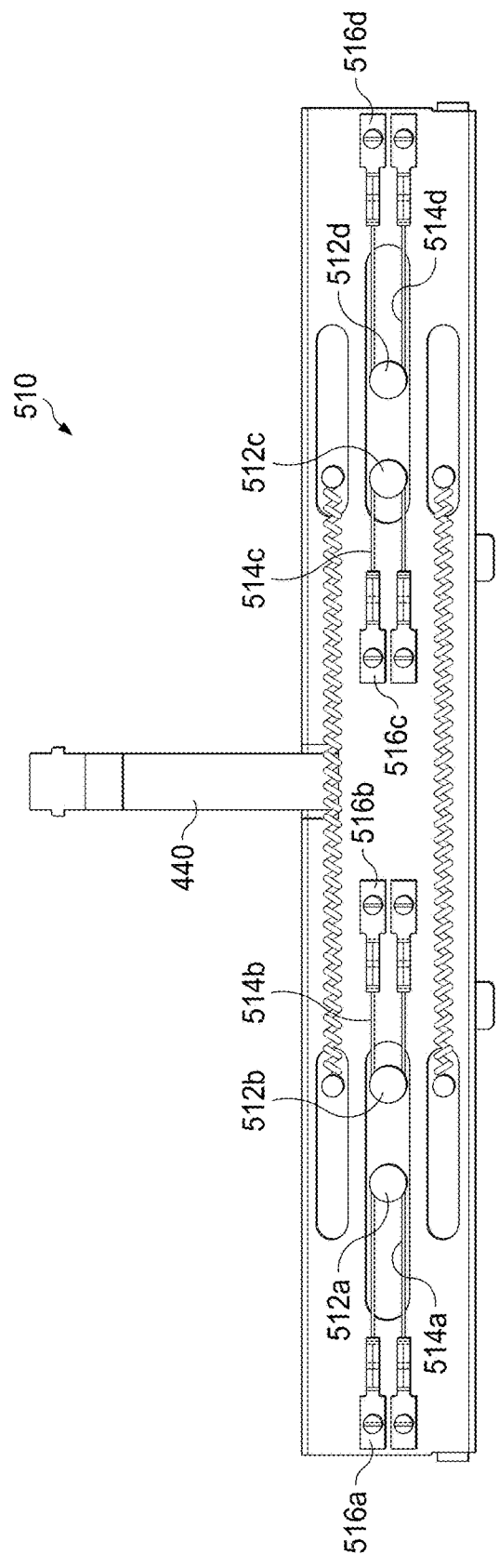

FIG. 5D depicts a bottom view 510 of selected elements of the information handling system shown in FIG. 5C. In FIG. 5D, the four sets of clamps 516, four muscle wires 514, four posts 514, and a wiring harness 440, among other elements, are visible. In the illustrated example, posts 512*a* and 512*b* are integrated with, or mechanically coupled to, wedge 420*a* (not shown in FIG. 5B) such that wedge 420*a*, post 512*a*, and post 512*b* all move together toward clamps 516*b* when muscle wire 514*b* contracts (e.g., when a controlling current is applied to muscle wire 514*b*). In this case, wedge 420*a* moves into a position in which retractable touchpad button 410*a* (not shown in FIG. 5B) is pushed upward into its raised and locked position and is held in that position until and unless the controlling current is removed from muscle wire 514*b*. Similarly, posts 512*c* and 512*d* are integrated with, or mechanically coupled to, wedge 420*b* (not shown in FIG. 5B) such that wedge 420*b*, post 512*c*, and post 512*d* all move together toward clamps 516*c* when muscle wire 514*c* contracts (e.g., when a controlling current is applied to muscle wire 514*c*). In this case, wedge 420*b* moves into a position in which retractable touchpad button 410*b* (not shown in FIG. 5B) is pushed upward into its raised and locked position and is held in that position until and unless the controlling current is removed from muscle wire 514*c*.

In some embodiments, a signal received from another component of the information handling system (e.g., over wiring harness 440 or other communication interface) indicating whether the information handling system lid is opened or closed may directly or indirectly cause current to be applied to muscle wires 514*a* and 514*d* to move the wedges 420 into their respective first positions or to muscle wires 514*b* and 514*c* to move the wedges 420 into their respective second positions, at different times. In at least some embodiments, only one pair of muscle wires (e.g., either outer muscle wires 514*a* and 514*d* or inner muscle wires 514*b* and 514*c*) are activated by an applied controlling current at a time. When one of the pairs of muscle wires is activated and contracts, each of the muscle wires in the other pair of muscle wires may be stretched and pulled toward the contracting muscle wires on the same side of the information handling system. For example when the outer muscle wires 514*a* and 514*d* contract, inner muscle wire 514*b* may be stretched and pulled along by its connection to post 512*b* toward outer muscle wire 514*a* and inner muscle wire 514*c* may be stretched and pulled along by its connection to post 512*c* toward outer muscle wire 514*d*. Similarly, when the inner muscle wires 514*b* and 514*c* contract, outer muscle wire 514*a* may be stretched and pulled along by its connection to post 512*a* toward inner muscle wire 514*b* and outer muscle wire 514*d* may be stretched and pulled along by its connection to post 512*d* toward inner muscle wire 514*c*. In some embodiments, an information handling system (or a retractable touchpad button bumper assembly thereof) may include return springs that keep various ones of the muscle wires in tension when no controlling current is being applied.

In some embodiments, to apply a current to the inner muscle wires or to the outer muscle wires, a current driving circuit in the information handling system (not shown) may be configured to drive a controlling current to two sets of clamps 516 (e.g., the outer clamps 516*a* and 516*d* or the inner clamps 516*b* and 516*c*) based on a signal indicating whether the information handling system lid is opened or closed. Each of the clamps that receives the controlling current may transfer the current to the muscle wires held in place by the clamp.

While two wedges 420 and corresponding retractable touchpad buttons 410 are shown in FIGS. 5A through 5D, the muscle wire mechanism described above may be used to move a single wedge 420 into its first or second position (e.g., in embodiments that include only a single retractable touchpad button) or may be used to move more than two wedges 420 into their respective first or second positions to raise or lower corresponding retractable touchpad buttons (e.g., in embodiments in which the information handling system includes more than two retractable touchpad buttons). In some embodiments, a separate set of muscle wires may be provided for each wedge/button pair in an information handling system that includes multiple retractable touchpad buttons 410.

While the example embodiment illustrated in FIGS. 5A-5D has been described in considerable detail, this is only one example of a mechanism for implementing retractable touchpad button bumpers. In other embodiments, any suitable mechanical, electrical, or electromechanical mechanism may be used for raising and lowering retractable touchpad buttons of an information handling system in response to a signal indicating whether the information handling system lid is open (or in the process of opening) or is closed (or in the process of closing) including, but not limited to, the additional example mechanisms illustrated in FIGS. 6 and 7A-7C and described below.

Figure 6:
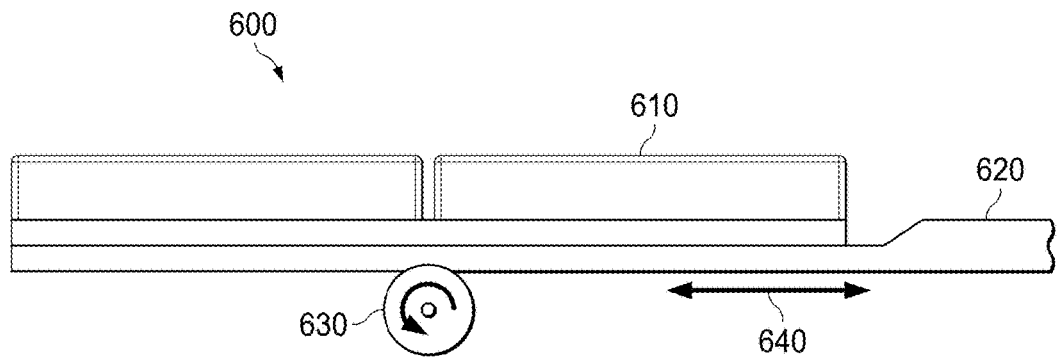
FIG. 6 is a block diagram illustrating selected elements of an example gear mechanism for raising and lowering retractable touchpad buttons of an information handling system, according to some embodiments.

FIG. 6 is a block diagram illustrating selected elements of an example gear mechanism 600 for raising and lowering retractable touchpad buttons of an information handling system, according to some embodiments. In some embodiments, the information handling system into which gear mechanism 600 is installed may be similar to the information handling system illustrated in FIGS. 3A and 3B or an information handling system into which retractable touchpad button bumper assembly 400 illustrated in FIGS. 4A and 4B is installed. As in the previous examples, when the retractable touchpad buttons are in a first position, they may be positioned such that they do not interfere with a user while typing or using the touchpad as an input mechanism during normal operation (e.g., when the when the information handling system lid is open). For example, they may lie in a recces in the base housing portion of an information handling system where they may be positioned to function as touchpad buttons. Alternatively, when the retractable touchpad buttons are in a second position, they may be positioned such that they function as bumpers.

In the illustrated example, the gear mechanism includes gear 630, which may be a motor driven gear. FIG. 6 illustrates the gear mechanism at a point in time at which wedge 620 is in its first position relatively near the outside edge of the information handling system and retractable touchpad button 610 is in its first position, where it may function as a touchpad button. Rotating gear 630 in a counterclockwise direction may cause wedge 620 to slide to the left such that the wedge feature of wedge 620 pushes retractable touchpad button 610 upward into its raised and locked position, where it may function as a bumper. Subsequently, rotating gear 630 in a clockwise direction may cause wedge 620 to slide to the right such that the wedge feature of wedge 620 moves out of the way of retractable touchpad button 610, allowing it to be lowered back into its first position to function as a touchpad button. In some embodiments, a signal received from another component of the information handling system (e.g., over a wiring harness or other communication interface) indicating whether the information handling system lid is opened or closed may directly or indirectly cause wedge 620 to move into either its first positions or its respective second position at different times.

While only a single wedge 620 and corresponding retractable touchpad button 610 are shown in FIG. 6, the illustrated gear mechanism may be used to move multiple wedges 620 into their respective first or second positions to raise or lower corresponding retractable touchpad buttons 610, in some embodiment. In other embodiments, a separate gear 630 may be provided for each wedge/button pair in an information handling system that includes multiple retractable touchpad buttons 610.

Figure 7A:
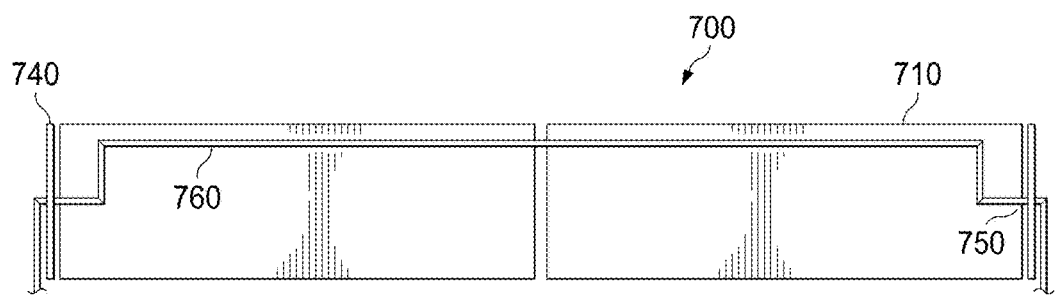
FIGS. 7A-7C are block diagrams illustrating selected elements of an example wire form mechanism for raising and lowering retractable touchpad buttons of an information handling system, according to some embodiments.
Figure 7B:
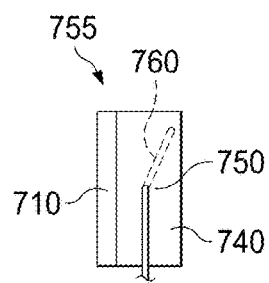
Figure 7C:
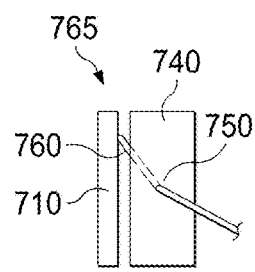

FIGS. 7A-7C are block diagrams illustrating selected elements of an example wire form mechanism 700 for raising and lowering retractable touchpad buttons of an information handling system, according to some embodiments. In some embodiments, the information handling system into which wire form mechanism 700 is installed may be similar to the information handling system illustrated in FIGS. 3A and 3B or an information handling system into which retractable touchpad button bumper assembly 400 illustrated in FIGS. 4A and 4B is installed. As in the previous examples, when the retractable touchpad buttons are in a first position, they may be positioned such that they do not interfere with a user while typing or using the touchpad as an input mechanism during normal operation (e.g., when the when the information handling system lid is open). For example, they may lie in a recces in the base housing portion of an information handling system where they may be positioned to function as touchpad buttons. Alternatively, when the retractable touchpad buttons are in a second position, they may be positioned such that they function as bumpers.

In the illustrated example, the wire form mechanism includes a wire form 760 that passes through an opening in a bracket portion 740 to the left of two retractable touchpad buttons 710 and through an opening in a similar bracket portion 740 to the right of the two retractable touchpad buttons 710. In the illustrated example, the points at which wire form 760 passes through bracket 740 (on either side) may serve as respective rotation points 750 about which wire form 760 rotates to raise and lower the retractable touchpad buttons 710. In some embodiments, wire form 760 may be driven by muscle wire or by a motor to rotate about the wire form rotation point 750 in different directions to raise and lower the retractable touchpad buttons 710.

FIG. 7A illustrates a bottom view of selected elements of the wire form mechanism 700 at a point in time at which the retractable touchpad buttons 710 are in their respective first positions relatively near the outside edges of the information handling system, where they may function as touchpad buttons. Rotating the wire form 760 in a first direction may cause apply a force on the retractable touchpad buttons 710 to move them upward into their respective second positions (e.g., into their raised and locked positions), where they may function as bumpers. Subsequently, rotating the wire form 760 in a second direction (e.g., in the opposite direction) may cause the retractable touchpad buttons 710 to be lowered back into their respective first positions to function as touchpad buttons. In some embodiments, a signal received from another component of the information handling system (e.g., over a wiring harness or other communication interface) indicating whether the information handling system lid is opened or closed may directly or indirectly cause wire form 760 to rotate in the first direction or in the second direction, at different times.

FIG. 7B depicts a rotated side view 755 of the information handling system illustrated in FIG. 7A when the wire form 760 is in its first position. In this position, wire form 760 does not apply any force on retractable touchpad button 710, therefore allowing retractable touchpad button 710 to lie on top of, or in close proximity to, bracket portion 740. In this position, which may be its standard operating position, retractable touchpad button 710 may function as a touchpad button. Rotating wire form 760 counterclockwise about wire form rotation point 750 may move wire form 760 into the position illustrated in FIG. 7C.

FIG. 7C depicts a rotated side view 765 of the information handling system illustrated in FIG. 7A when the wire form 760 is in its second position. In this position, wire form 760 applies a force on retractable touchpad button 710, pushing it upward and away from bracket portion 740 into its raised and locked position, where it may function as a bumper. Subsequently rotating wire form 760 clockwise about wire form rotation point 750 may move wire form 760 back into the position illustrated in FIG. 7B and return retractable touchpad button 710 to its lowered position, e.g., its standard operating position.

In some embodiments (e.g., in embodiments that include only a single retractable touchpad button), the wire form mechanism described above may be used to move a single retractable touchpad button 710 into its standard operating position (where it may function as a touchpad button) or into its raised and locked position (where in may function as a bumper). In other embodiments, the wire form mechanism described above may be used to move two or more retractable touchpad buttons 710 into their respective first or second positions (e.g., in embodiments in which the information handling system includes two or more retractable touchpad buttons). In some embodiments, a separate wire form mechanism may be provided for each retractable touchpad button 710 in an information handling system that includes multiple retractable touchpad buttons 710.

FIG. 8 is a flow diagram illustrating selected elements of an embodiment of a method 800 for providing retractable touchpad buttons in an information handling system, as described herein. It is noted that certain operations described in method 800 may be optional or may be performed in a different order than the order illustrated in FIG. 8, in different embodiments. Method 800 may begin at 802 by receiving, in an information handling system including a retractable touchpad button bumper assembly, a signal indicating whether the lid is open or closed. For example, the retractable touchpad button bumper assembly may be installed in the chassis of an information handling system (e.g., in the base housing portion) using standoffs and screws, or using other types of mounting components. In some embodiments, a processor subsystem or an embedded controller of the information handling system may include circuitry and/or logic for receiving, as an input, a lid state signal indicating whether the lid is open (or in the process of opening) or closed (or in the process of closing) from a proximity sensing circuit.

If, at 804, the received signal indicates that the lid is closed (or in the process of closing), method 800 may continue to 806. Otherwise (e.g., if the received signal indicates that the lid is open or is in the process of opening), the method may proceed to 808. At 806, method 800 may include providing a signal to the retractable touchpad button bumper assembly that causes one or more touchpad buttons to be raised to a position at which they act as bumpers between the display portion of the information handling system (e.g., in the lid housing portion) and the base housing portion of the information handling system.

At 808, the method may include providing a signal to the retractable touchpad button bumper assembly that causes the one or more touchpad buttons to be lowered to a position at which they are recessed in the base housing portion of the information handling system for normal operation. In some embodiments, a processor subsystem or an embedded controller of the information handling system may include circuitry and/or logic for providing one or more control signal outputs to the retractable touchpad button bumper assembly to cause the touchpad buttons to be raised and/or lowered depending on the lid state signal. The control signal outputs may directly or indirectly cause the touchpad buttons to be raised and/or lowered, in different embodiments. The touchpad buttons may be raised and lowered using any suitable electrical, mechanical, or electromechanical mechanisms including, but not limited to, those described herein.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a base housing portion;
   a lid housing portion rotationally coupled to the base housing portion such that in a first lid position the lid housing portion is open with respect to the base housing portion and in a second lid position the lid housing portion is closed over the base housing portion;
   a touchpad installed in the base housing portion; and
   a retractable touchpad button bumper assembly coupled to the touchpad and comprising:
      a retractable touchpad button configured to operate as an input device for the touchpad when the retractable touchpad button is in a first touchpad button position in a recess in the base housing portion and to serve as a bumper between the base housing portion and the lid housing portion when the retractable touchpad button is in a second touchpad button position, the second touchpad button position being higher than the first touchpad button position relative to the base housing portion;
   wherein:
      when the lid housing portion is open, the retractable touchpad button is retracted into the first touchpad button position; and
      when the lid housing portion is closed, the retractable touchpad button is raised into the second touchpad button position.

2. The information handling system of claim 1, wherein:
   the retractable touchpad button bumper assembly further comprises a communication interface through which the retractable touchpad button bumper assembly receives a lid state signal indicating whether the lid housing portion is open or closed;
   the retractable touchpad button is retracted into the first touchpad button position responsive to the lid state signal indicating that the lid housing portion is open; and
   the retractable touchpad button is raised into the second touchpad button position responsive to the lid state signal indicating that the lid housing portion is closed.

3. The information handling system of claim 1, wherein:
   the retractable touchpad button bumper assembly further comprises a wedge-shaped element;

when the lid housing portion is open:
only a first portion of the wedge-shaped element lies between the retractable touchpad button and the base housing portion such that the wedge-shaped element does not prevent the retractable touchpad button from retracting into the first touchpad button position; and when the lid housing portion is closed:
the first portion of the wedge-shaped element and a second portion of the wedge-shaped element lie between the retractable touchpad button and the base housing portion; and
the wedge-shaped element applies an upward force on the retractable touchpad button such that the retractable touchpad button is raised into and held in the second touchpad button position.

4. The information handling system of claim 3, wherein:
the retractable touchpad button bumper assembly comprises two retractable touchpad buttons and two wedge-shaped elements; and
at least a portion of each of the two wedge-shaped elements lies between a respective one of the two retractable touchpad buttons and the base housing portion.

5. The information handling system of claim 3, wherein the retractable touchpad button bumper assembly further comprises:
a first muscle wire mechanically coupled to the wedge-shaped element and to the base housing portion such that when the first muscle wire is contracted it pulls the wedge-shaped element into a first wedge position in which only the first portion of the wedge-shaped element lies between the retractable touchpad button and the base housing portion; and
a second muscle wire mechanically coupled to the wedge-shaped element and to the base housing portion such that when the second muscle wire is contracted it pulls the wedge-shaped element into a second wedge position in which the first portion of the wedge-shaped element and the second portion of the wedge-shaped element lie between the retractable touchpad button and the base housing portion.

6. The information handling system of claim 5, wherein the retractable touchpad button bumper assembly further comprises circuitry to:
drive a current to the first muscle wire when the lid housing portion is open; and
drive a current to the second muscle wire when the lid housing portion is closed.

7. The information handling system of claim 3, wherein:
the retractable touchpad button bumper assembly further comprises a motor-driven gear mechanically coupled to the wedge-shaped element;
the motor-driven gear is operable to move the wedge-shaped element into a first wedge position in which only the first portion of the wedge-shaped element lies between the retractable touchpad button and the base housing portion responsive to the lid housing portion opening; and
the motor-driven gear is operable to move the wedge-shaped element into a second wedge position in which the first portion of the wedge-shaped element and the second portion of the wedge-shaped element lie between the retractable touchpad button and the base housing portion responsive to the lid housing portion closing.

8. The information handling system of claim 1, wherein:
the retractable touchpad button bumper assembly further comprises a wire form installed in the base housing portion and in contact with the retractable touchpad button;
when the lid housing portion is opened, the wire form is rotated about a rotation point in a first rotation direction such that the wire form applies a downward force on the retractable touchpad button lowering the retractable touchpad button into the first touchpad button position; and
when the lid housing portion is closed, the wire form is rotated about the rotation point in a second rotation direction such that the wire form applies an upward force on the retractable touchpad button raising the retractable touchpad button into the second touchpad button position.

9. A retractable touchpad button bumper assembly, comprising:
a retractable touchpad button configured to move between a first touchpad button position and a second touchpad button position dependent on whether a lid housing portion of an information handling system in which the retractable touchpad button bumper assembly is installed is in an open position or a closed position with respect to a base housing portion of the information handling system to which the lid housing portion is rotationally coupled;
wherein:
when the lid housing portion is in the open position, the retractable touchpad button is in the first touchpad button position, in which the retractable touchpad button is retracted into a recess in the base housing portion; and
when the lid housing portion is in the closed position, the retractable touchpad button is in the second touchpad button position, in which the retractable touchpad button is raised to a position higher than the first position relative to the base housing portion.

10. The retractable touchpad button bumper assembly of claim 9, wherein:
the retractable touchpad button bumper assembly further comprises a communication interface through which the retractable touchpad button bumper assembly receives a lid state signal indicating whether the lid housing portion is in the open position or the closed position;
the retractable touchpad button is retracted into the first touchpad button position responsive to the lid state signal indicating that the lid housing portion is in the open position; and
the retractable touchpad button is raised into the second touchpad button position responsive to the lid state signal indicating that the lid housing portion is in the closed position.

11. The retractable touchpad button bumper assembly of claim 9, wherein:
the retractable touchpad button bumper assembly further comprises a wedge-shaped element;
when the lid housing portion is in the open position:
only a first portion of the wedge-shaped element lies between the retractable touchpad button and the base housing portion such that the wedge-shaped element does not prevent the retractable touchpad button from retracting into the first touchpad button position; and when the lid housing portion is in the closed position:
the first portion of the wedge-shaped element and a second portion of the wedge-shaped element lie between the retractable touchpad button and the base housing portion; and
the wedge-shaped element applies an upward force on the retractable touchpad button such that the retractable touchpad button is raised into and held in the second touchpad button position.

12. The retractable touchpad button bumper assembly of claim 11, wherein:
the retractable touchpad button bumper assembly comprises two retractable touchpad buttons and two wedge-shaped elements; and
at least a portion of each of the two wedge-shaped elements lies between a respective one of the two retractable touchpad buttons and the base housing portion.

13. The retractable touchpad button bumper assembly of claim 11, wherein the retractable touchpad button bumper assembly further comprises:
a first muscle wire mechanically coupled to the wedge-shaped element and to the base housing portion such that when the first muscle wire is contracted it pulls the wedge-shaped element into a first wedge position in which only the first portion of the wedge-shaped element lies between the retractable touchpad button and the base housing portion; and
a second muscle wire mechanically coupled to the wedge-shaped element and to the base housing portion such that when the second muscle wire is contracted it pulls the wedge-shaped element into a second wedge position in which the first portion of the wedge-shaped element and the second portion of the wedge-shaped element lie between the retractable touchpad button and the base housing portion.

14. The retractable touchpad button bumper assembly of claim 13, wherein the retractable touchpad button bumper assembly further comprises circuitry to:
drive a current to the first muscle wire when the lid housing portion is in the open position; and
drive a current to the second muscle wire when the lid housing portion is in the closed position.

15. The retractable touchpad button bumper assembly of claim 11, wherein:
the retractable touchpad button bumper assembly further comprises a gear mechanically coupled to the wedge-shaped element;
the gear is operable to move the wedge-shaped element into a first wedge position in which only the first portion of the wedge-shaped element lies between the retractable touchpad button and the base housing portion responsive to the lid housing portion opening; and
the gear is operable to move the wedge-shaped element into a second wedge position in which the first portion of the wedge-shaped element and the second portion of the wedge-shaped element lie between the retractable touchpad button and the base housing portion responsive to the lid housing portion closing.

16. The retractable touchpad button bumper assembly of claim 9, wherein:
the retractable touchpad button bumper assembly further comprises a wire form installed in the base housing portion and in contact with the retractable touchpad button;
when the lid housing portion is opened, the wire form is rotated about a rotation point in a first rotation direction such that the wire form applies a downward force on the retractable touchpad button lowering the retractable touchpad button into the first touchpad button position; and
when the lid housing portion is closed, the wire form is rotated about the rotation point in a second rotation direction such that the wire form applies an upward force on the retractable touchpad button raising the retractable touchpad button into the second touchpad button position.

17. The retractable touchpad button bumper assembly of claim 9, wherein the retractable touchpad button is configured to operate as an input device for a touchpad to which the retractable touchpad button is coupled when in the first touchpad button position and to serve as a bumper between the base housing portion and the lid housing portion when in the second touchpad button position.

18. A method, comprising:
detecting, while a lid housing portion of an information handling system is in an open position with respect to a base housing portion of the information handling system to which the lid housing portion is rotationally coupled, that the lid housing portion is closing; and
in response to detecting that the lid housing portion is closing:
raising a retractable touchpad button from a first touchpad button position in which the retractable touchpad button lies in a recess in the base housing portion to a second touchpad button position at a height relative to the base housing portion at which the retractable touchpad button serves as a bumper between the base housing portion and the lid housing portion when the lid housing portion is closed over the base housing portion.

19. The method of claim 18, further comprising:
detecting, while the lid housing portion is closed over the base housing portion, that the lid housing portion is opening; and
in response to detecting that the lid housing portion is opening:
lowering the retractable touchpad button from the second touchpad button position to the first touchpad button position.

20. The method of claim 19, wherein:
detecting that the lid housing portion is closing comprises receiving a signal from a proximity sensing circuit indicating that the lid housing portion has moved into proximity with the base housing portion; and
detecting that the lid housing portion is opening comprises receiving a signal from the proximity sensing circuit indicating that the lid housing portion has moved away from the base housing portion.

* * * * *